EXTENDED RANGE FREQUENCY DISCRIMINATOR

Filed June 24, 1964 3 Sheets-Sheet 1

INVENTORS
ROBERT N. DOBLE
ROBERT J. MILLER
BY

INVENTORS.
ROBERT N. DOBLE
ROBERT J. MILLER
BY
ATTORNEY

Jan. 16, 1968 R. N. DOBLE ETAL 3,364,431

EXTENDED RANGE FREQUENCY DISCRIMINATOR

Filed June 24, 1964 3 Sheets-Sheet 3

INVENTORS
ROBERT N. DOBLE
ROBERT J. MILLER
BY
ATTORNEY

United States Patent Office 3,364,431
Patented Jan. 16, 1968

3,364,431
EXTENDED RANGE FREQUENCY DISCRIMINATOR

Robert N. Doble, Palo Alto, and Robert James Miller, San Bruno, Calif., assignors to General Precision Systems Inc., a corporation of Delaware Filed June 24, 1964, Ser. No. 377,550
11 Claims. (Cl. 329—122)

ABSTRACT OF THE DISCLOSURE

A mixer circuit generates a difference frequency signal by combining an input signal with a local oscillator signal. The difference frequency signal is amplitude limited and passed by a frequency sensitive capacitor to provide a direct voltage level corresponding to the frequency of the input signal and to the frequency of the difference signal. A pair of diodes connected in series compares the direct voltage level with a reference voltage, and the diodes pass an alternating signal from a reference oscillator having an amplitude corresponding to the direct voltage level. An ultimate output signal may be obtained by amplifying and rectifying the alternating signal.

This invention relates to a frequency discriminator and more particularly to an improved frequency discriminator operable to convert changes of an input frequency into an analog output voltage over a greater frequency range than is possible with present day LC type discriminators.

Frequency discriminators have long been used in such devices as high frequency radio receivers by way of example, when it is desired to automatically control the frequency of the local oscillator of the receiver. To attain this feature, the analog output voltage is coupled to the local oscillator in such manner as to determine the instantaneous frequency of oscillations. Thereafter, any tendency of the oscillator to shift frequency as a result of changes in temperature or other environmental conditions is sensed by the frequency discriminator and the analog output voltage is altered to compensate for such tendencies.

In general, the frequency discriminators of the prior art employ resonant inductive-capacitive circuits wherein the frequency range is directly proportional to the loaded Q of such circuits. All of these circuits utilize the impedance versus frequency curve provided by either a series or parallel resonant circuit. More recently, highly sophisticated arrangements such as the ratio detector and the Foster-Seely discriminator have been developed. In each of these devices, however, the operating frequency range is severely limited. Additionally, the transfer characteristics adjacent to the operating range of such circuits may indicate zero signal, or on tune, conditions for very large frequency deviations. Thus, the various circuits of the prior art have not proved completely satisfactory for the reasons that it is necessary that very stable local oscillators be employed in order to confine the operating frequencies within the narrow frequency range of the discriminator. Further, and perhaps more important, the discriminator circuits of the prior art tend to provide output signals outside their operating range which results in false indications.

According to the present invention, however, there is provided an improved frequency discriminator which employs a minimum of inductive components in order to avoid instability of operation. Basically, the only frequency sensitive element is a capacitor, and the resultant change of impedance as a function of frequency is employed as a main operating parameter without yielding unwanted side effects. Further, the capacitor is coupled between a variable frequency source and the necessary circuitry for generating a DC voltage, the amplitude of which is an analog of the frequency applied to the capacitor. Additionally, a noise free AC voltage is applied to the circuit, the magnitude of the AC voltage being determined by the difference between a reference voltage and a variable voltage supplied by the variable frequency source, all as more particularly hereinafter described.

It is an object of the invention, therefore, to provide a frequency discriminator.

Another object of the invention is to provide an improved frequency discriminator to convert changes of an input frequency into an analog output voltage.

Still another object of the invention is to provide an improved frequency discriminator operative over a greater frequency range than heretofore possible.

Yet another object of the invention is to provide an improved frequency discriminator operative to convert a pair of DC voltages differing by a fraction of a volt into an equivalent AC signal without the adverse effects of ambient noise, temperature changes, and fluctuations of power supply voltages.

A further object of the invention is to provide an improved frequency discriminator which employs a capacitive voltage divider to convert deviations in frequency into a DC analog voltage equivalent.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
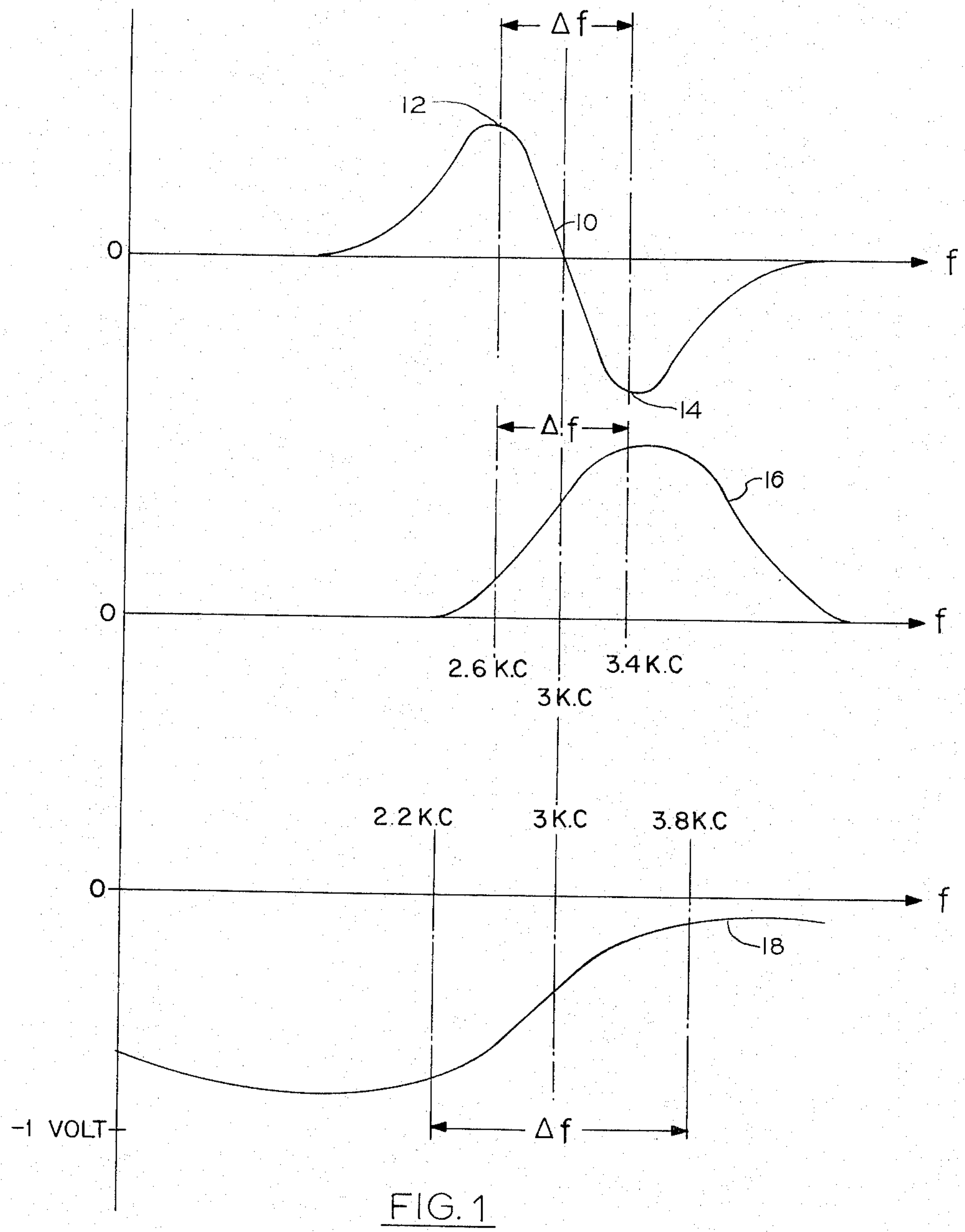
FIG. 1 illustrates the transfer functions of prior art frequency discriminators and of the frequency discriminator of the present invention.

Referring now to the drawings, FIG. 1 illustrates the transfer functions of various frequency discriminators. The upper curve 10 of FIG. 1 shows the transfer function provided by the well known Foster-Seely discriminator or a ratio detector. It will be seen that a limited operating range is provided between peaks 12 and 14 which may be, by way of example, 800 c.p.s. For all frequencies outside of this operating range, however, such discriminators provide an extraneous output signal, and, further, for frequencies remote from the center frequency of the discriminator, a zero signal indicative of on tune conditions is generated.

Additionally curve 16 of FIG. 1 illustrates the transfer function of an L.C. resonant filter. Again only a limited operating range is provided, which also may be 800 c.p.s. by way of example. Note should be made of the fact that such filters provide extraneous output signals when the applied frequency is remote from the center frequency of the discriminator. Each of the discriminators outlined above generate these extraneous signals when the applied frequency is close to their operating frequency range. It is for this reason that the local oscillator whose frequency is to be controlled must generally be very stable.

The transfer function provided by the discriminator of the present invention, however, avoids each of the above limitations as shown by curve 18 of FIG. 1. Not only is an extended frequency range available, 1600 c.p.s. using the same frequency scale employed for curves 10 and 16, but no extraneous signals are generated until the applied frequency is extremely remote from the operating range. Stated otherwise, a true control signal is generated even though the applied frequency is not in the operating range of the discriminator, and this control signal may thereafter be employed to correct the frequency of the local oscillator.

Figure 2:
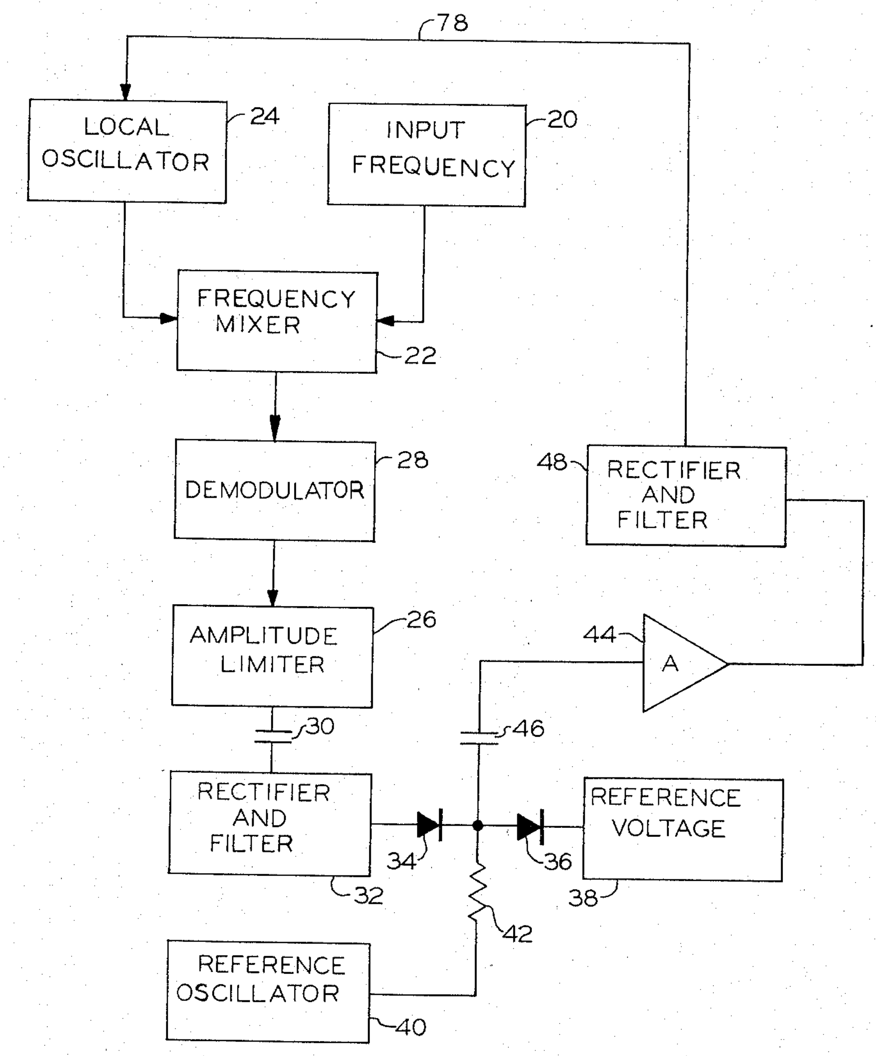
FIG. 2 is a block diagram of a preferred embodiment of the apparatus of the invention.

FIG. 2 illustrates a typical system employing a preferred embodiment of the frequency discriminator of the invention. As thereshown an input frequency from a source 20, which may be an antenna or a variable frequency oscillator, is applied as one input to a frequency mixer 22. A second input to the mixed is coupled to a local oscillator 24. The resultant difference frequency is then directed to an amplitude limiter 26 and a demodulator 28. The amplitude limited voltage supplied by demodulator 28 is then fed through a capacitor 30 to a rectifier and filter unit 32. The value of capacitor 30 is so chosen that its impedance changes drastically throughout the frequency range of interest. Consequently. the magnitude of voltage provided by filter unit 32 varies accordingly, and is essentially an analog of the change in frequency between the input frequency and the frequency of the local oscillator. However, it should be noted that normally it is desired to detect small frequency shifts, and, under these conditions, the change in voltage across capacitor 30 is in the order of a fraction of a volt.

For this reason the output of filter unit 32 is applied to a pair of series connected diodes 34 and 36. The cathode of diode 36 is held constant by a reference voltage supply 38, which may be by way of example, plus one volt. The anode of diode 34 will vary between approximately zero volts for low input frequencies to about plus one and one-half volts as the input frequency increases, as a result of the voltage division provided by capacitor 30 and a filter capacitor forming a part of filter unit 32. Further, a reference oscillator 40, whose output amplitude is large compared to the DC potential applied to diodes 34 and 36, is coupled to the junction of the diodes through a resistor 42. In this manner the potential at the diode junction raises to the reference voltage provided by supply 38 before limiting on the positive excursions of the signal generated by reference oscillator 40, and falls to the potential fed to diode 34 on the negative excursions. Thus, an AC signal is developed at the diode junction which is proportional to the voltage difference between the reference voltage and the voltage applied to diode 34. This AC signal is coupled to an amplifier 44 through a capacitor 46, the output of which is delivered to another rectifier and filter unit 48 to provide a DC control signal proportional to the AC signal from capacitor 46.

Figure 3:
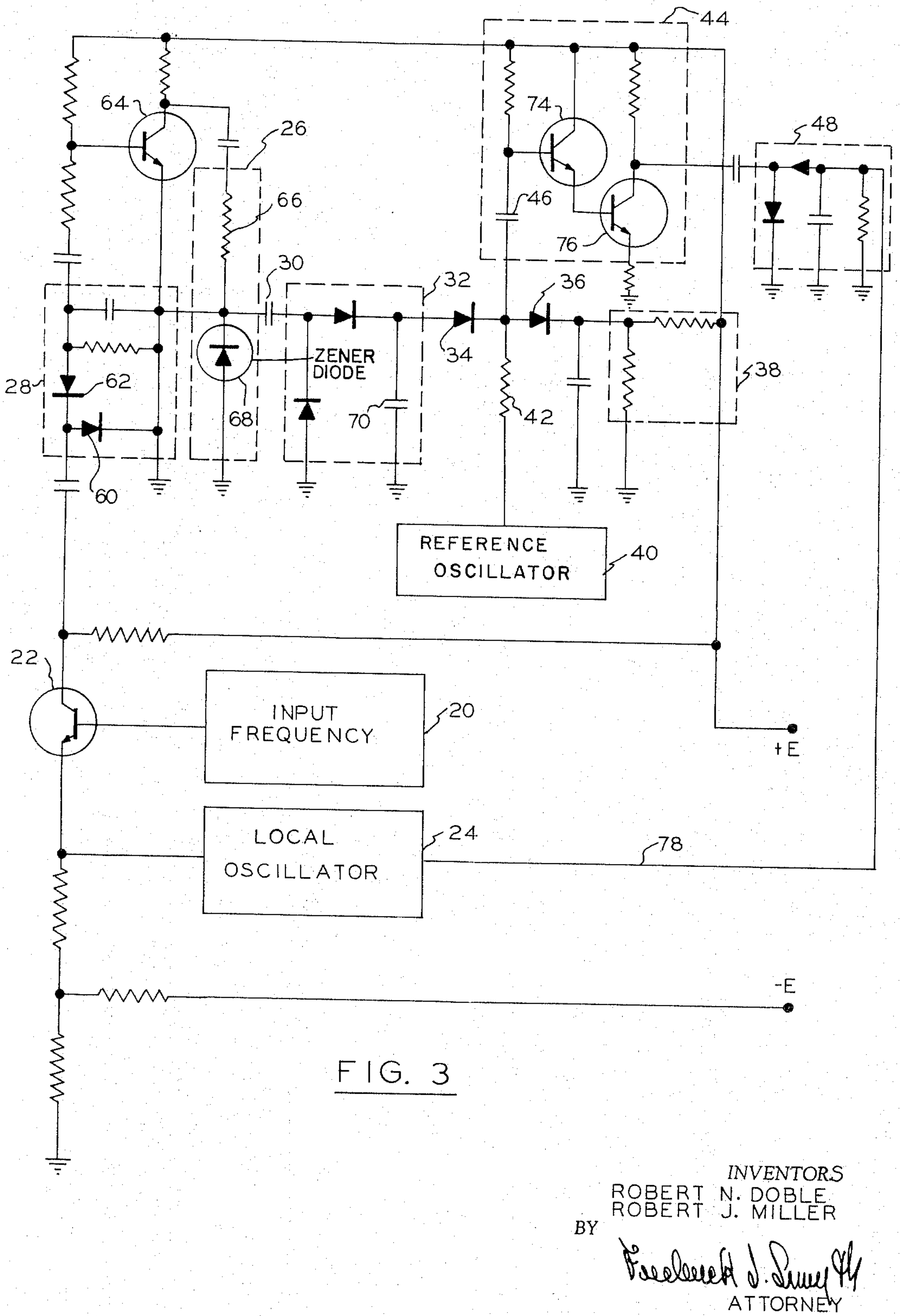
FIG. 3 is a schematic diagram of the preferred embodiment illustrated in FIG. 2.

Referring now to FIG. 3, there is illustrated a schematic diagram of the embodiment of FIG. 2, with the various blocks of FIG. 2 outlined by dashed lines. As shown in FIG. 3, the input frequency is applied to the base of mixer transistor 22 and the local oscillator signal is coupled to the emitter electrode thereof. The difference, or beat frequency is detected by demodulator 28, which includes a pair of rectifying diodes 60 and 62 and a conventional RC filter. Although demodulator 28 has been chosen to detect the difference frequency between the input and local oscillator frequencies, it will be understood that the sum frequency may be detected if desired. The output of demodulator is then applied to the base of a conventional amplifying transistor 64. The output of transistor 64 is applied to amplitude limiter which consists essentially of a resistor 66 electrically connected in series with a Zener diode 68. This combination is operative to stabilize the peak-to-peak amplitude of the signal provided by transistor 64, and is required because rectifier and filter unit 32, together with capacitor 30 are responsive to changes in amplitude as well as to changes in frequency.

The amplitude limited signal is next fed through capacitor 30 to rectifier and filter unit 32 which operate in combination to provide the novel transfer function of the invention. As stated above, the capacitance of capacitor 30 is selected so that its reactance changes drastically over the operating range of frequencies. However, a further capacitor 70, within filter unit 32, is so selected that its reactance is relatively low throughout the frequency range of interest. Thus, capacitors 30 and 70 form an effective voltage divider, and the DC potential applied to diode 34 is a direct function of the beat frequency, and this voltage, which appears across capacitor 70, is an exact analog of the change in the difference frequency. Additionally, this signal operates as a control for the AC waveform provided by reference oscillator 40, which in conjunction with diodes 34 and 36 provides a simple, yet highly reliable, method of amplifying the small voltage changes which are developed across capacitor 70 as the difference frequency changes, and converts these small voltage changes into a more useful amplitude.

Further, as shown in FIG. 3, reference voltage supply 38 may be merely a resistive divider network coupled to the positive power supply. Alternatively, supply 38 may be eliminated, since it has been found that the reference oscillator, of and by itself, is operable to properly bias diode 36. In either case, proper operation of the frequency discriminator is attained by clamping the cathode of diode 36 at approximately one volt positive with respect to ground.

The AC signal generated at the junction between diodes 34 and 36 is then coupled through capacitor 46 to amplifier 44, which, as shown in FIG. 3, may comprise a pair of transistors 74 and 76 connected in a modified Darlington arrangement. The output of amplifier 44 is then delivered to rectifier and filter unit 48 operable to convert the AC signal into a DC control voltage. This control voltage is next coupled to local oscillator 25 by means of a line 78. Local oscillator 24 may be any of the well known voltage controlled oscillators. A specific example of a voltage controlled oscillator which is readily adaptable for use with the frequency discriminator of the present invention is shown and described in Patent No. 3,316,498, granted Apr. 25, 1967 to Robert N. Doble et al., and assigned to the assignee of this invention.

The operation of the invention may further be understood by again referring to the transfer function as illustrated by curve 18 in FIG. 1. The high frequency limit of curve 18 results when the DC voltage developed across capacitor 70 is equal to or greater than the reference potential applied to the cathode of diode 36. Diodes 34 and 36, during conduction, severely attenuate the sine wave provided by reference oscillator 40 since their forward resistance is much less than the resistance of resistor 42. However, the forward resistance of each of diodes 34 and 36 is not zero, resulting in a minimum AC potential of about 50 millivolts appearing at the diode junction. The lower frequency limit of the transfer function is caused by the sine wave provided by reference oscillator 40 alternately driving transistor 76 into saturation and cut off. As the frequency decreases by a large amount, the DC voltage across capacitor 70 likewise decreases since the increased reactance of capacitor 30 attenuates most of the low frequency drive signal applied to rectifier and filter unit 22, permitting the voltage at the diode junction to swing between ground and the reference potential applied to the cathode of diode 36.

The frequency discriminator of the present invention is also contemplated for use in inductive loop vehicle detecting systems such as disclosed in copending applications Ser. No. 95,236 filed Mar. 13, 1961, on behalf of Robert A. Kleist et al., now Patent No. 3,164,802 and Ser. No. 172,620 filed Feb. 12, 1962 on behalf of Martin J. Prucha, each of which has been assigned to the assignee of the present invention. These applications describe arrangements for sensing vehicles wherein inductive loops are electrically connected as a part of an oscillator circuit such that the inductance value of the loop will control the frequency of oscillation. The output signal from the loop oscillator is fed to a mixer circuit together with a further signal generated by a local oscillator to obtain a different frequency. When a vehicle moves into the magnetic field of the loop, the inductance value thereof varies to shift the frequency of the loop oscillator. Although the frequency shift of the loop oscillator will be a relatively small value as compared to the normal oscillator frequency, the difference frequency generated by the mixer will vary considerably as compared with the normal difference frequency. Such a widely varying difference frequency may be easily detected by inexpensive output circuitry which may operate relay switching or the like.

It has been found, however, that the loop oscillator is subject to a wide frequency drift independent of the presence or absence of a vehicle as a result of being exposed to temperature changes, variations in moisture content of the ground and streetpaving due to rain or snow, and the like. For this reason it has been difficult until now to maintain a predetermined difference frequency in such systems. By utilizing the frequency discriminator of the present invention, however, the local oscillator is caused to accurately follow the frequency drift of the loop oscillator, and the predetermined difference frequency may be accurately maintained. Further, the frequency discriminator of the invention is operable to track the local oscillator with the loop oscillator even when the presence of a vehicle is detected, a long time constant circuit being employed in the presence indication circuit as more particularly described in copending application Ser. No. 380,559, filed July 6, 1964, on behalf of Robert N. Doble et al. and assigned to the assignee of this invention. It should also be noted large metallic objects, such as motor vehicles, generally cause an enormous frequency shift in the loop oscillator which has resulted in that conventional discriminators of the prior art cannot follow this shift and provide a zero output signal which is indicative of on tune conditions or the absence of a vehicle presence. In the present invention, however, the only such unwanted region of operation exists at a frequency so far removed from the center frequency (see FIG. 1), that no vehicle, no matter how large, will cause a loop oscillator frequency shift that would require the frequency discriminator to operate in the unwanted frequency region.

What has been described is an improved frequency discriminator which employs the chopping action provided by a reference oscillator and a pair of diodes biased at different DC voltages to convert a DC differential voltage into an AC analog of the DC differential voltage. Additionally, a capacitive voltage divider, formed by capacitors 30 and 70, is utilized to convert deviations in frequency into an equivalent DC differential voltage. Finally, the circuitry of the invention provides a high degree of stability without requiring either regulated power supplies or elaborate DC amplifiers, the absence of noise in the final output signal derived from a reference oscillator, and a transfer function which exhibits a greater frequency range than hitherto possible.

It will thus be seen that the objects set forth above, among those made apparent from the preceding description, are efficiently attained, and since certain changes may be made in the above construction without departing from the scope of the invention, it is intended that all matter contained or shown in the accompanying drawing shall be interpreted as illustrative and not in a limiting sense.

The embodiments of the invention in which an exclusive property or privilege is claimed are defined as follows:

1. A frequency discriminator having a transfer characteristic effective over an extended frequency range comprising:

a first and second capicators, said first capacitor exhibiting a reactance which varies throughout said frequency range and said second capacitor exhibiting an essentially constant reactance throughout said frequency range;

first and second diodes;

means coupling said first capacitor and said first and second diodes electrically in series and said second capacitor in parallel with said first capacitor and said serially coupled first and second diodes;

a reference oscillator;

means resistably coupling the output of said reference oscillator to the junction between said serially coupled first and second diodes; and means applying a variable difference frequency signal to said first capacitor.

2. The discriminator of claim 1 wherein said difference frequency signal is amplitude limited.

3. The discriminator of claim 1 wherein a rectifier and filter unit is coupled intermediate said first capacitor and said first and second diodes.

4. The discriminator of claim 1 wherein said difference frequency signal is provided by a frequency mixer responsive to the difference in frequency of a loop oscillator and a local oscillator.

5. The discriminator of claim 1 wherein said difference frequency signal is provided by a frequency mixer responsive to the sum of the signals of a loop oscillator and a local oscillator.

6. The discriminator of claim 1 wherein said first capacitor is about 2200 $\mu\mu$f, said second capacitor is about 0.22 $\mu$f, and said reference oscillator operates at a frequency of 180 kc.

7. A frequency discriminator having a transfer function effective over an extended frequency range comprising:

a capacitor, a rectifier, and first and second switching devices;

means connecting said capacitor, said rectifier, and said first and second switching devices electrically in series;

a reference oscillator;

means coupling the output signal of said reference oscillator to the junction of said first and second switching devices; and means for applying a variable frequency signal to said capacitor, whereby said capacitor attenuates said applied frequency signal in accordance with its capacitive reactance and said rectifier biases said first switching device correspondingly to said attenuation.

8. The discriminator of claim 7 including means for biasing said second switching device whereby the amplitude of the output signal of said reference oscillator is limited at said junction both by said rectifier and said biasing means.

9. A frequency discriminator comprising:

a local oscillator providing a first frequency signal and a variable oscillator providing a second frequency signal;

mixing means for combining said first and second frequency signals and providing a third frequency signal;

a reference oscillator providing a fourth frequency signal; and means responsive to said third frequency signal operable to control the amplitude of said fourth frequency signal.

10. The discriminator of claim 9 further including means responsive to the amplitude of said fourth frequency signal to provide a DC voltage indicative of the frequency of said third frequency signal.

11. The discriminator of claim 9 wherein said last name means includes a frequency sensitive capacitor serially connected with a pair of diodes and said fourth frequency signal is applied to the junction of said pair of diodes.

References Cited

UNITED STATES PATENTS

| | | | |
|---|---|---|---|
| 2,702,852 | 2/1955 | Briggs | 329—122 |
| 3,292,093 | 12/1966 | Clarke et al. | 329—204 |

ALFRED L. BRODY, *Primary Examiner.*

ROY LAKE, *Examiner.*